A. SVENSON.
APPARATUS FOR TESTING PIPE JOINTS.
APPLICATION FILED SEPT. 3, 1919.
1,354,925.
Patented Oct. 5, 1920.
2 SHEETS—SHEET 1.
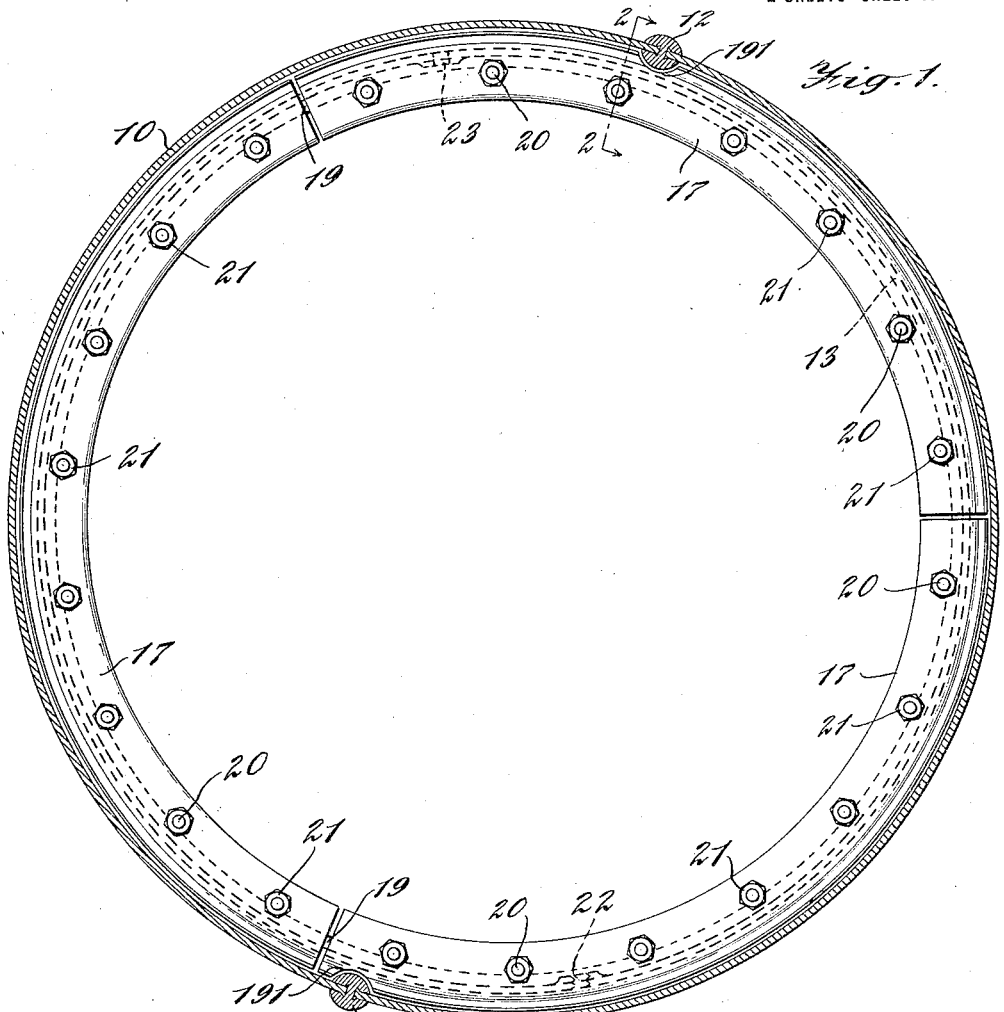
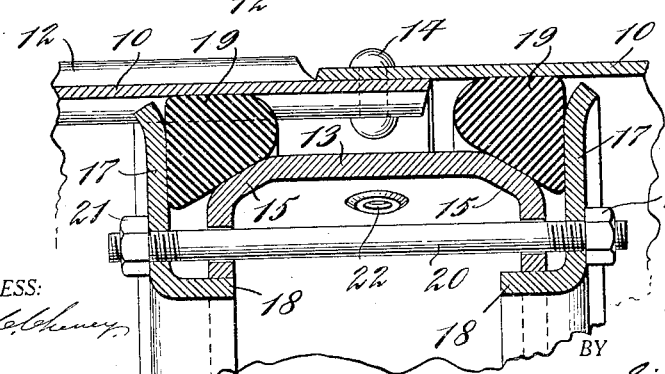
WITNESS:
INVENTOR.
ALBERT SVENSON
BY
ATTORNEYS

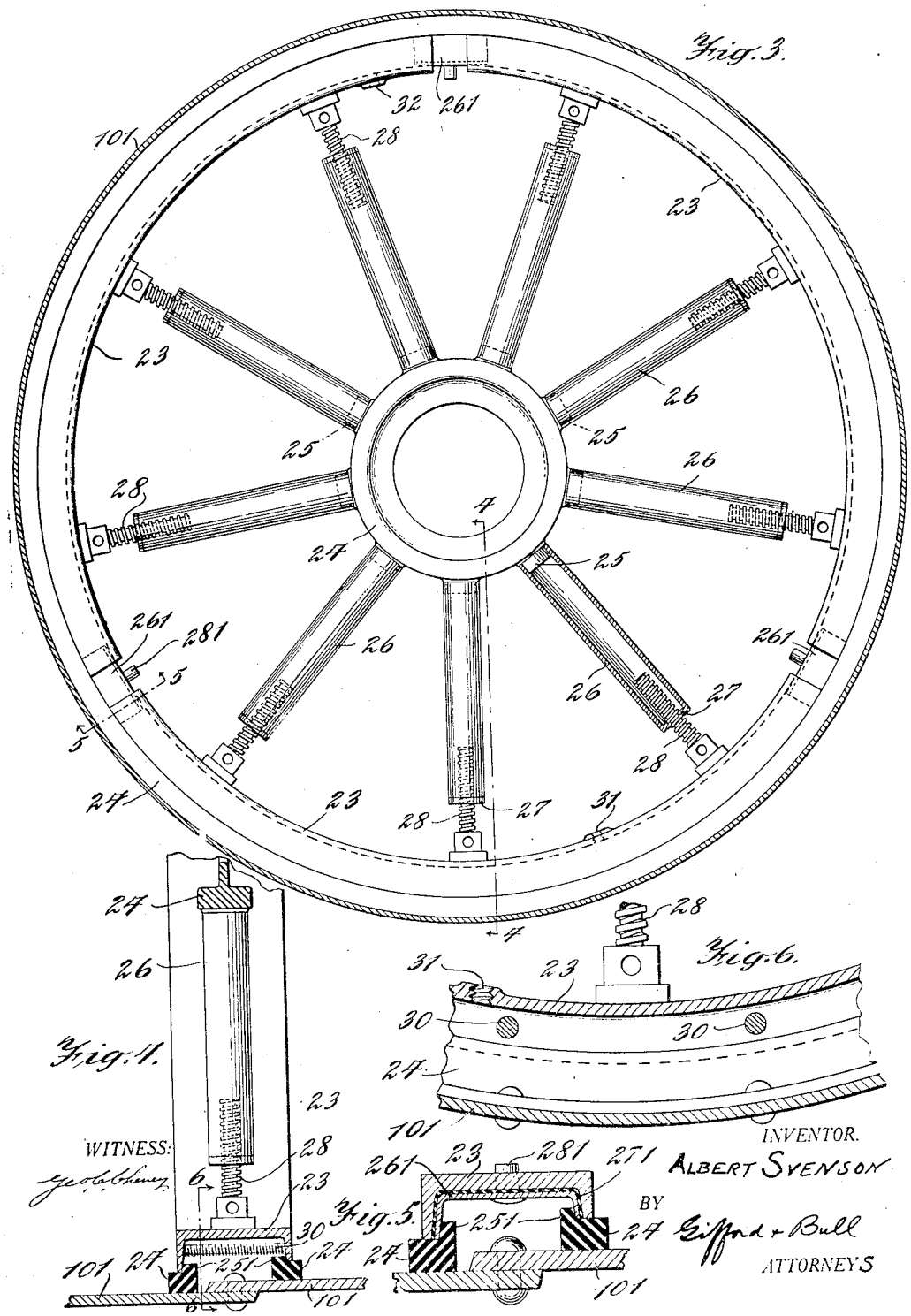

UNITED STATES PATENT OFFICE.

ALBERT SVENSON, OF LAKEVIEW, NEW JERSEY.

APPARATUS FOR TESTING PIPE-JOINTS.

1,354,925. Specification of Letters Patent. Patented Oct. 5, 1920.

Application filed September 3, 1919. Serial No. 321,492.

*To all whom it may concern:*

Be it known that I, ALBERT SVENSON, a citizen of the United States, residing at 32 Donald street, Lakeview, in the county of Passaic, State of New Jersey, have invented certain new and useful Improvements in Apparatus for Testing Pipe-Joints, of which the following is a specification.

My invention more particularly relates to an apparatus for testing in peripherally riveted joints of pipe particularly after such joints have been formed at the place where the pipes are laid.

My invention will best be understood by reference to the accompanying drawings in which Figure 1 is a side view of a device embodying one form of my invention; Fig. 2 is an enlarged cross section on the line 2—2 of Fig. 1; Fig. 3 is a side view illustrating a modified form of my invention; Fig. 4 is an enlarged cross section on the line 4—4 of Fig. 3; Fig. 5 is an enlarged view on the line 5—5 of Fig. 3, and Fig. 6 is a side elevation of a part of the device, taken on the line 6—6 of Fig. 4.

In the drawings like reference characters indicate like parts.

In Figs. 1 and 2, I have illustrated my invention applied to a pipe formed with a lock bar joint, the two sections of the pipe being indicated at 10, 10, and the ends of the pipe preferably being of dovetailed form, as best shown in Fig. 1, the lock bar which secures the two sections of the pipe together being indicated at 12, in which the edges of the lock bar have been forced into position to form a tight joint with the ends of the sections 10, 10, as by hydraulic pressure. The circumferential riveted joint between the two sections of pipe is shown in cross section in Fig. 2, one of the rivets being shown at 14.

The apparatus embodying my invention for testing the riveted joint comprises, in the form here shown, an annular ring 13 which is to be disposed within the pipe to be tested and is formed at its edges with beveled sections as at 15. Follower plates 17, here shown as three in number, are provided with flanges 18 which engage the inner periphery of the rings 15, the outwardly extending flanges engaging yielding gaskets 19 formed of rubber or the like, and of the form shown in Fig. 2. The gaskets are preferably provided with a recess 191 in which the lock bar joint is received, as best shown in Fig. 1. The follower plates 17 are drawn against the plates 19 by means of bolts 20 and nuts 21.

An annular channel is thus formed around the joint to be tested. A fluid under pressure, preferably water, is then introduced through any suitable opening as 22 formed in the ring 13, the apparatus being preferably provided with a vent 23 similar to the inlet through which the air may be driven out while the apparatus is being filled. It will be understood, of course, that after the apparatus is filled with liquid, the vent 23 is then closed in any suitable manner and the required pressure applied to the liquid to test the joint.

The just-described form of my invention is particularly applicable to pipes, the sections of which are formed with a longitudinal lock bar joint without any longitudinal riveted seams.

In Figs. 3, 4, 5 and 6, I have shown an embodiment of my invention that is particularly applicable to the testing of the circumferential riveted seams of pipes formed of sections with longitudinally riveted seams. A collapsible ring is formed of a plurality of sections 23, here shown as three, of channel iron, the flanges of which extend outwardly. The ring is supported on a center ring 24, the center ring being provided with bosses 25 on which are mounted the ends of pipe sections 26 on the ends of which may be placed collars 27 within which jack screws 28 are received, the outer ends of the jack screws engaging the channel irons 23. Annular gaskets 24 formed of rubber or other flexible material are positioned between the flanges of the channel iron 23 and are disposed on either side of the joint to be tested, as shown in Fig. 5. The gaskets 24 are formed with shoulders as at 251 and arranged as shown in Fig. 5 so that, when the receptacle formed by the channel iron 23 and gaskets 24 and the pipe section 101 are filled with liquid under pressure, the shoulders will rest firmly against the flanges of the channel iron and form a tight joint and at the same time prevent the gaskets from being displaced from engagement with the flanges of the channel iron when the interior is subjected to pressure. Preferably the channel iron 23 has beveled faces, as shown, where it contacts with the gaskets 24, to increase the closeness of contact between it and the gaskets, when the parts are pressed together. The joints between the adjacent sections of the channel iron are formed by members 261 conforming in contour with the channel iron 23 and fitting within the same as best shown in Figs. 1 and 5, the member 261 being provided on its outer surface with a layer 271 of rubber or the like which will form a tight joint with the ends of the channel iron 23. The member 261 is preferably provided with an inwardly extending positioning stud 281. If desired for strengthening purposes, stay bolts, as at 30, may be provided for the channel sections 23.

An opening as at 31 in one of the sections 23 is provided for the entrance of the testing fluid, and an opening 32 at the opposite side for the exit of the air while the testing space is being filled, the latter opening being closed before the testing pressure is applied.

It will be understood that the apparatus is moved along from one joint to the next of the pipe as it is successively laid in the field. In the form shown in Figs. 3 to 6 the sections are collapsed for this purpose, while in the form shown in Figs. 1 and 2, it is only necessary to remove the follower plates and rubber rings, the central ring in this case being integral.

The advantages of my present arrangement will be obvious. Riveted joints in large pipes may be tested with the use of a minimum amount of liquid, the provision of the necessary quantity of which is often a serious matter in the field. If a large quantity of fluid is necessary for testing, the disposal of it in case a joint breaks is often a serious matter. With my arrangement only a small quantity of water or other fluid is sufficient to test the largest pipes.

It will be observed that, in the form of Figs. 1 and 2, the principal member of the channel forming device is one piece, while in the other form it is made up of a plurality of pieces. This difference is due to the different modes of making a tight joint between the pipe and the channel device. If desired, however, it will be understood that the ring may be made up of a plurality of parts in both forms. In any event it will be understood that the device when the central ring is made up of a plurality of parts, operates precisely the same as when made up of a single piece, so far as the testing of the joint is concerned. In each case, a small liquid-tight channel is formed around the joint.

I claim:—

1. In an apparatus of the class described, a device having an annular channel adapted to surround a circumferential pipe joint and means whereby a fluid-tight joint is formed between the edges of said channel and the pipe, said device having an opening whereby fluid under pressure may be supplied to said channel to test the pipe joint.

2. In an apparatus of the class described, a device having an annular channel adapted to surround a circumferential pipe joint, gaskets between the edges of said channel and the pipe, means by which said gaskets may be pressed against said edges and the pipe to form a fluid-tight joint therebetween, said device having an opening whereby fluid under pressure may be supplied to said channel to test the pipe joint.

3. In an apparatus of the class described, a ring of less diameter than that of the pipe to be tested, gaskets extending around the interior of the pipe and contacting with the edges of said ring, means for pressing said gaskets between said edges and the interior of the pipe, said ring and said gaskets forming a liquid-tight channel around the joint to be tested, said annular member having an opening whereby fluid under pressure may be supplied to said channel to test the joint.

4. In an apparatus of the class described, an annular member of less diameter than that of the pipe to be tested, said member having beveled sections on its side, gaskets adapted to fit between said beveled sections and the pipe to be tested, to form a channel around the joint to be tested, means to press said gaskets between the pipe and said beveled sections to form a liquid-tight joint, said member having an opening whereby fluid under pressure may be supplied to said channel to test the joint.

5. In an apparatus of the class described, a unitary ring of less diameter than that of the pipe to be tested, gaskets adapted to fit between the ring and the interior of the pipe and to be spaced apart to receive the joint to be tested in the channel formed by said ring and said gaskets, means whereby said gaskets may be pressed against said ring and the pipe to form a liquid-tight joint, said ring having an opening whereby liquid under pressure may be admitted to said channel to test the joint.

6. In an apparatus of the class described, an annular device having flexible flanges forming a channel on the exterior of the annulus and means to press said flexible flanges against the interior of a pipe on either side of the joint to be tested, said device having an opening whereby fluid under pressure may be admitted to said channel to test the joint.

ALBERT SVENSON.